United States Patent
Line et al.

(10) Patent No.: US 9,649,963 B2
(45) Date of Patent: May 16, 2017

(54) TRIM AND FOAM ASSEMBLY FOR A VEHICLE SEAT

(71) Applicant: Ford Global Technologies, LLC, Dearborn, MI (US)

(72) Inventors: Johnathan Andrew Line, Northville, MI (US); Mandeep Singh Sidhu, Canton, MI (US); Christian J. Hosbach, Allen Park, MI (US)

(73) Assignee: Ford Global Technologies, PLLC, Dearborn, MI (US)

( * ) Notice: Subject to any disclaimer, the term of this patent is extended or adjusted under 35 U.S.C. 154(b) by 429 days.

(21) Appl. No.: 14/196,694

(22) Filed: Mar. 4, 2014

(65) Prior Publication Data

US 2015/0251579 A1    Sep. 10, 2015

(51) Int. Cl.
*B60N 2/64* (2006.01)
*B60N 2/68* (2006.01)
(Continued)

(52) U.S. Cl.
CPC .............. *B60N 2/64* (2013.01); *B60N 2/6009* (2013.01); *B60N 2/68* (2013.01); *B60N 2/686* (2013.01);
(Continued)

(58) Field of Classification Search
CPC .......... B60N 2/64; B60N 2/6009; B60N 2/68; B60N 2/686; B60N 2/70; B60N 2/7005; B60N 2/7011
(Continued)

(56) References Cited

U.S. PATENT DOCUMENTS

| 2,958,369 A | 11/1960 | Pitts et al. |
| 3,403,938 A | 10/1968 | Cramer et al. |

(Continued)

FOREIGN PATENT DOCUMENTS

| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Anthony D Barfield
(74) *Attorney, Agent, or Firm* — Vichit Chea; King & Schickli, PLLC

(57) ABSTRACT

A vehicle seating assembly includes a seat frame disposed between an integrally formed back panel and an inner close-out panel. A cushion assembly is operably coupled to the inner close-out panel. A composite support member is substantially encompassed by the cushion assembly. The composite support member includes attachment members projecting rearwardly from inside the cushion assembly that engage with the inner close-out panel. The attachment members include snap-fit features disposed at a lower portion of the composite support member. Retaining rings are disposed at an upper portion of the composite support member. An upper trim piece extends over a top portion of the seat frame, the back panel, and the inner close-out panel.

17 Claims, 9 Drawing Sheets

(51) Int. Cl.
*B60N 2/60* (2006.01)
*B60N 2/70* (2006.01)

(52) U.S. Cl.
CPC ............. *B60N 2/70* (2013.01); *B60N 2/7005* (2013.01); *B60N 2/7011* (2013.01)

(58) Field of Classification Search
USPC ....................................... 297/452.59, 452.18
See application file for complete search history.

(56) References Cited

U.S. PATENT DOCUMENTS

| | | |
|---|---|---|
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |
| 5,171,062 A | 12/1992 | Courtois |
| 5,174,526 A | 12/1992 | Kanigowski |
| 5,518,294 A | 5/1996 | Ligon, Sr. et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 8,342,607 B2 | 1/2013 | Hofmann et al. |
| 8,998,338 B2 * | 4/2015 | Vander Veen ......... A47C 1/032 297/452.59 X |
| 2003/0025370 A1 | 2/2003 | Hensel et al. |
| 2003/0213105 A1 | 11/2003 | Bednarski |
| 2004/0195870 A1 | 10/2004 | Bohlender et al. |
| 2005/0200166 A1 | 9/2005 | Noh |
| 2006/0043777 A1 | 3/2006 | Friedman et al. |
| 2007/0120401 A1 | 5/2007 | Minuth et al. |
| 2008/0174159 A1 | 7/2008 | Kojima et al. |
| 2009/0066122 A1 | 3/2009 | Minuth et al. |
| 2009/0165263 A1 | 7/2009 | Smith |
| 2009/0322124 A1 | 12/2009 | Barkow et al. |
| 2010/0038937 A1 | 2/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |

(56) References Cited

U.S. PATENT DOCUMENTS

| | | |
|---|---|---|
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0241255 A1 | 9/2013 | Kulkarni et al. |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

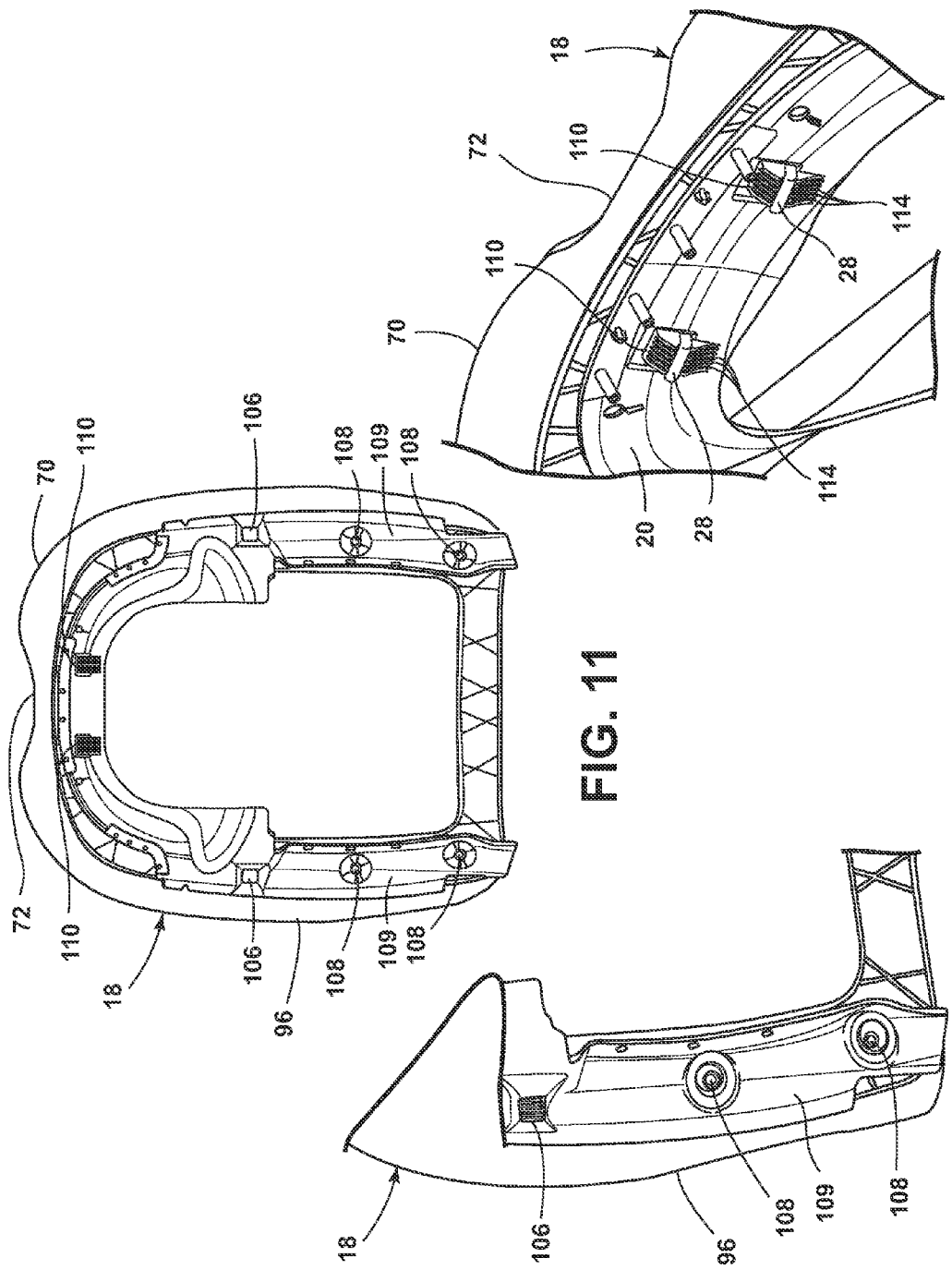

TRIM AND FOAM ASSEMBLY FOR A VEHICLE SEAT

FIELD

The present disclosure generally relates to a vehicle seating assembly, and more particularly to a vehicle seating assembly having a modular quick trim and foam assembly.

BACKGROUND

The general construction of the vehicle seating assembly of the present disclosure is designed to be lightweight and thin, yet rigid, to provide support and comfort to a passenger during travel.

SUMMARY

According to one aspect of the present disclosure, a vehicle seating assembly includes a seat frame disposed between an integrally formed back panel and an inner close-out panel. A cushion assembly is operably coupled to the inner close-out panel. A composite support member is substantially encompassed by the cushion assembly. The composite support member includes attachment members projecting rearwardly from inside the cushion assembly that engage with the inner close-out panel. The attachment members include snap-fit features disposed at a lower portion of the composite support member. Retaining rings are disposed at an upper portion of the composite support member. An upper trim piece extends over a top portion of the seat frame, the back panel, and the inner close-out panel.

According to another aspect of the present disclosure, a vehicle seating assembly includes a seat frame disposed between an integrally formed back panel and an inner close-out panel and a cushion assembly. A composite support member is substantially encompassed by the cushion assembly. The composite support member includes attachment members projecting rearwardly from inside the cushion assembly that engage with the inner close-out panel. An upper trim piece extends over a top portion of the seat frame, the back panel, and the inner close-out panel.

According to yet another aspect of the present disclosure, a vehicle seatback includes a cushion assembly. A composite support member is substantially encompassed by the cushion assembly and defines a large central opening. The composite support member includes engagement loops spaced peripherally around the large central opening and snap-fit connection features exposed through the cushion assembly and engaged with snap-fit connection features on an inner close-out panel. A hard back panel is operably coupled to the cushion assembly. An upper trim piece extends over a top portion of the inner close-out panel.

According to still another aspect of the present disclosure, a vehicle seating assembly includes a vehicle seatback and a vehicle seat. The vehicle seatback includes a composite support member that is completely or substantially encased in a cushion assembly. The composite support member includes a plurality of attachment features configured for engagement with an inner close-out panel. The inner close-out panel is configured for engagement with at least one of a seat frame and a back panel, and an upper trim piece is configured to extend over the inner close-out panel, the seat frame, and the back panel. The seatback provides a composite support member and cushion assembly that are integrally formed to provide a lightweight and comfortable solution to seated passengers. The proposed design is robust and includes minimal parts, thereby lessening the complications associated with the manufacturing process.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 11 is a rear elevational view of one embodiment of a cushion assembly and a rear closeout panel of the present disclosure;

FIG. 12 is a rear partial elevational view of snap-fit features of a composite support member engaged with an inner closeout panel; and FIG. 13 is a top partial perspective view of attachment members of a composite support member engaged with an inner closeout panel.

DETAILED DESCRIPTION OF THE EMBODIMENTS

Figure 1A:
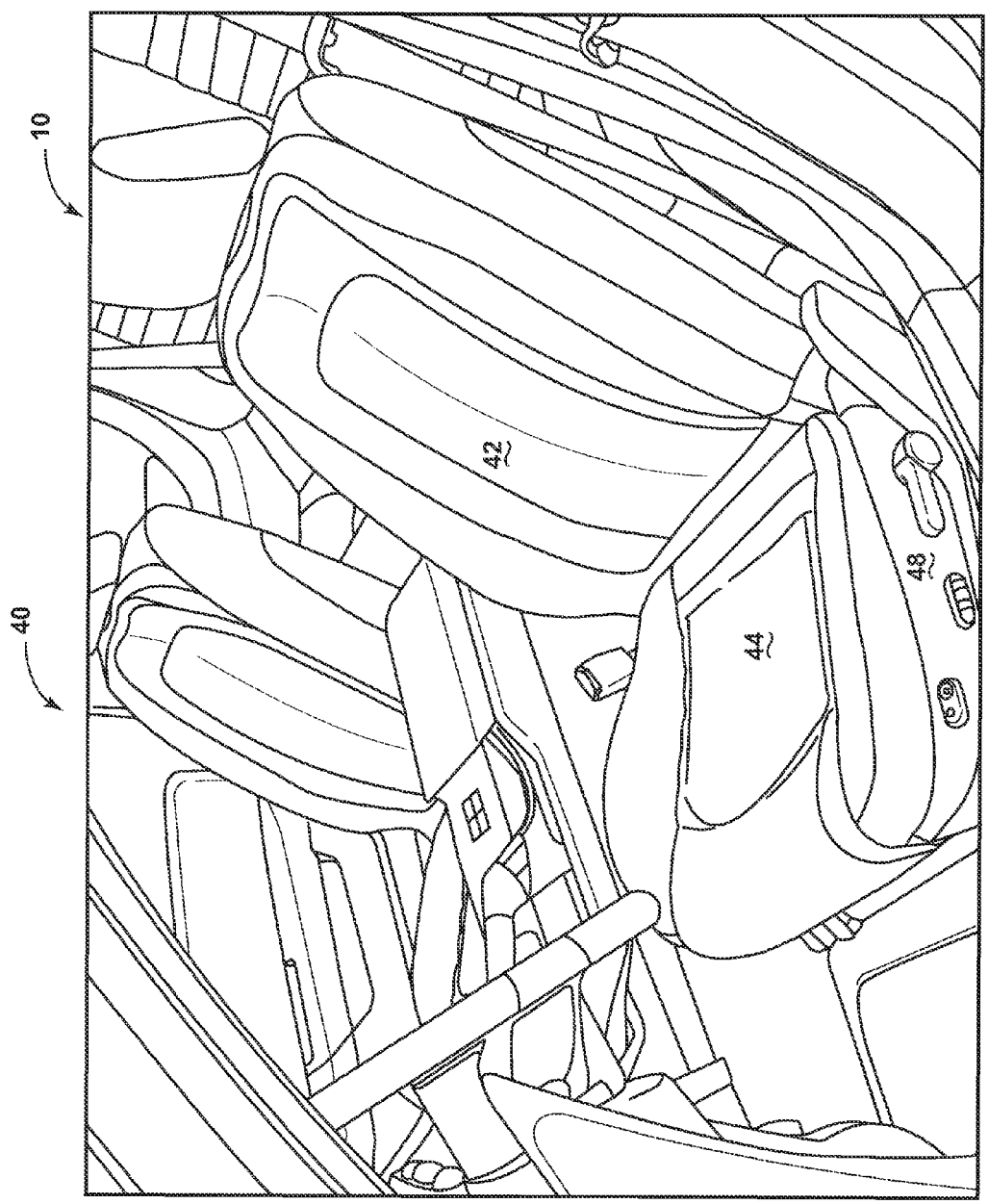
FIG. 1A is a front perspective view of an interior of a vehicle having a vehicle seating assembly of the present disclosure.
Figure 1B:
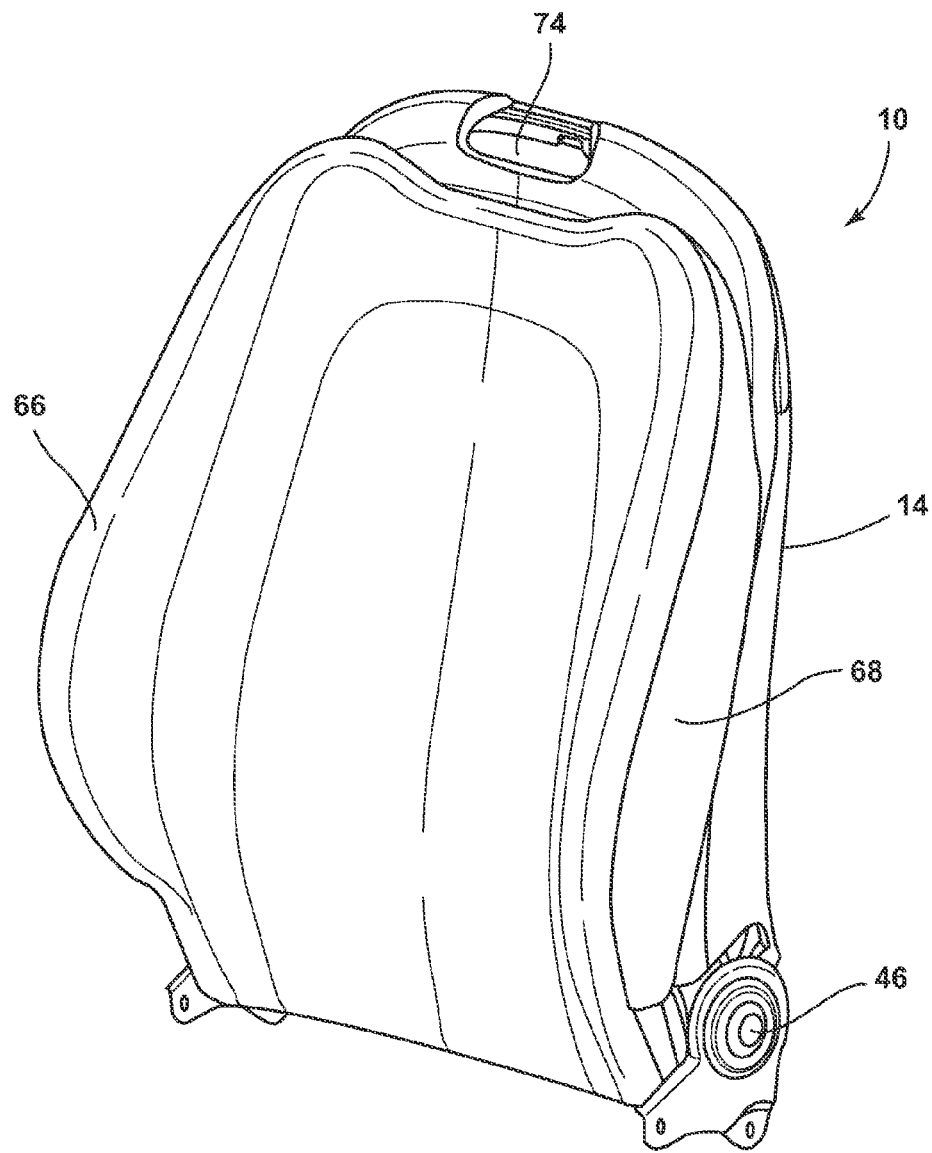
FIG. 1B is a front perspective view of one embodiment of a seatback of the vehicle seating assembly of FIG. 1A.
Figure 2:
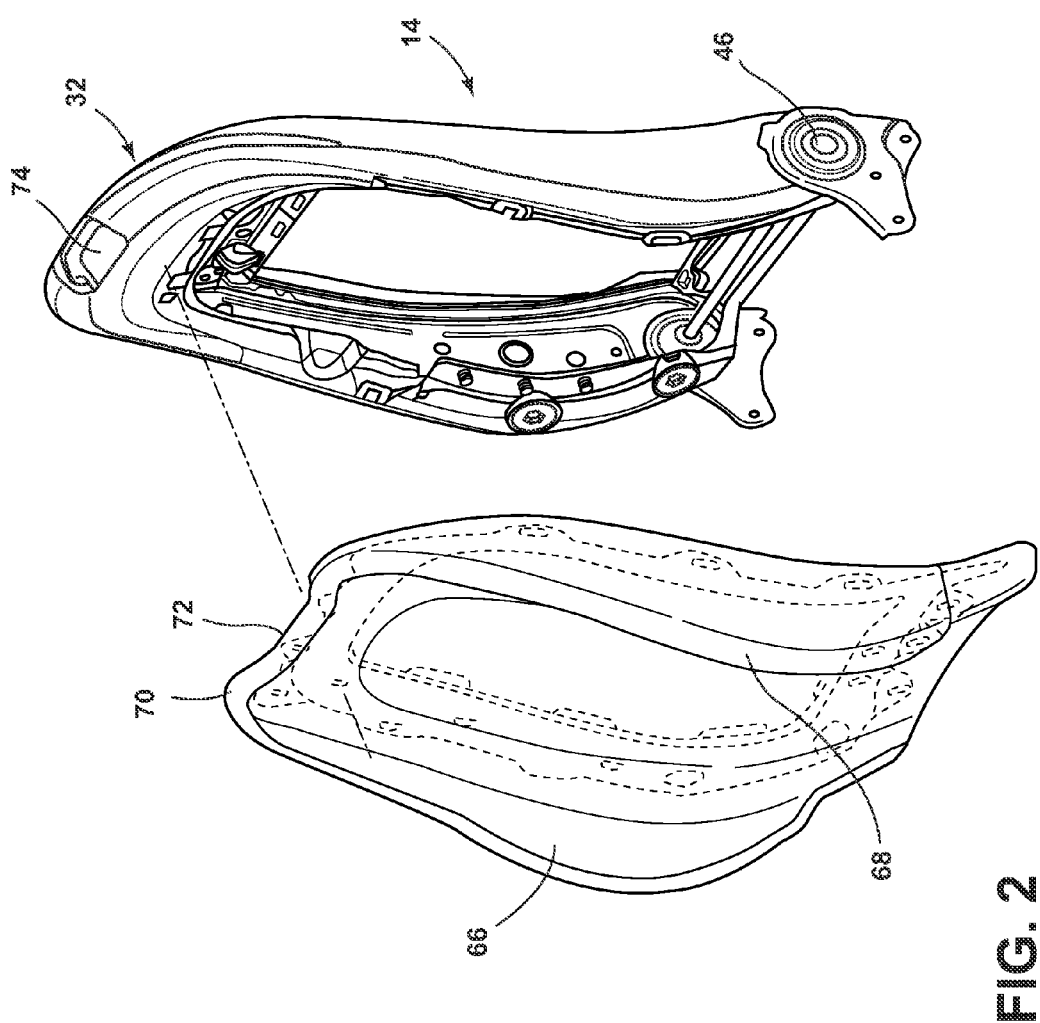
FIG. 2 is a partially exploded front perspective view of the seatback of FIG. 1B.
Figure 3:
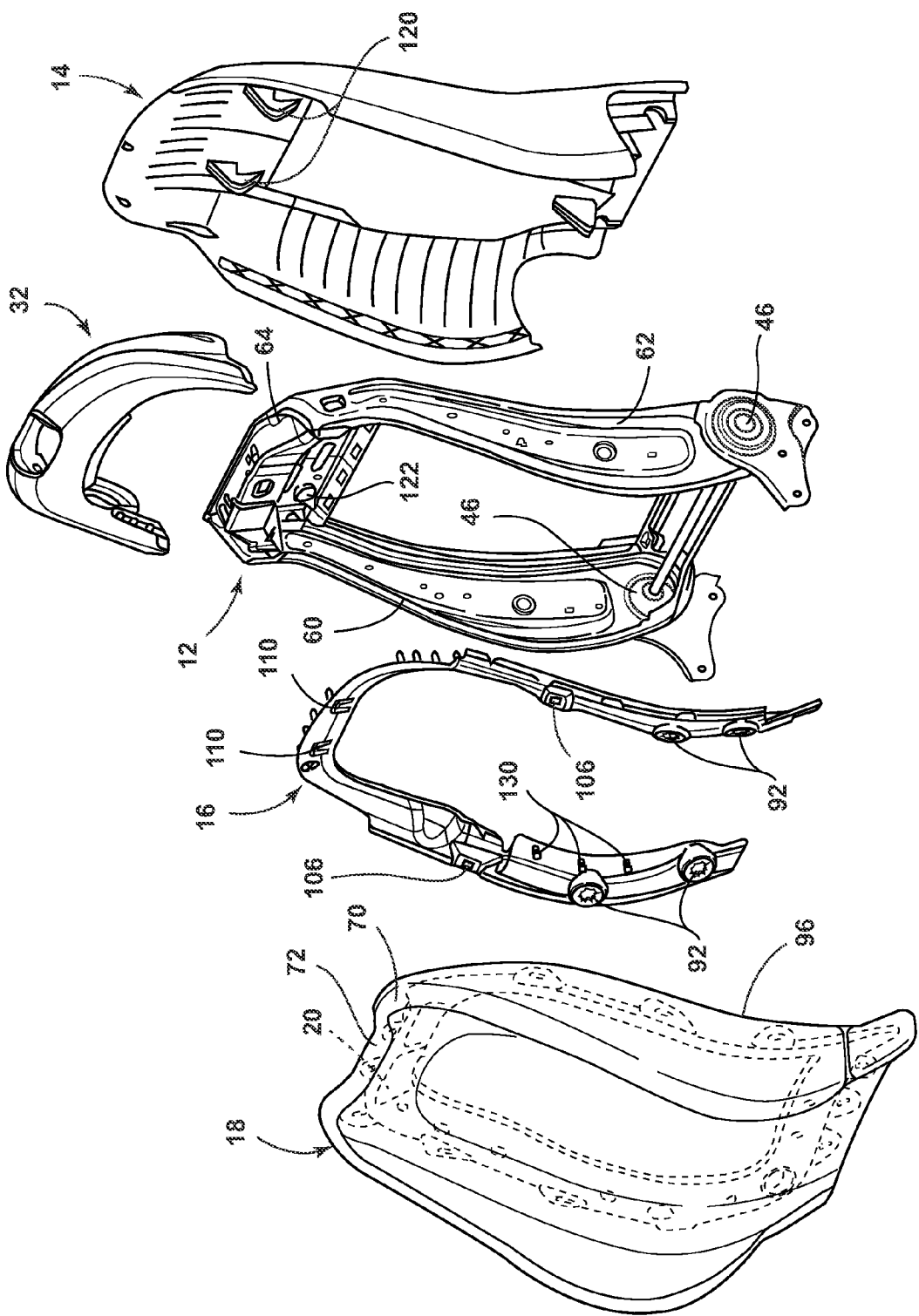
FIG. 3 is a partially exploded front perspective view of the setback of FIG. 1B.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiments shown in FIGS. 1A-4, reference numeral 10 generally designates a vehicle seating assembly that includes a seat frame 12 disposed between an integrally formed back panel 14 and an inner close-out panel 16. A cushion assembly 18 is operably coupled with the inner close-out panel 16. A composite support member 20 is substantially encompassed by the cushion assembly 18. The composite support member 20 includes attachment members 22 projecting rearwardly from inside the cushion assembly 18 that engage with the inner close-out panel 16. The attachment members 22 include snap-fit features 24 disposed at a lower portion 26 of the composite support member 20. Retaining rings 28 are disposed at an upper portion 30 of the composite support member 20. An upper trim piece 32 extends over a top portion of the seat frame 12, the back panel 14, and the inner close-out panel 16.

Referring again to FIGS. 1A-4, the vehicle seating assembly 10 is generally configured for use in a vehicle 40. The vehicle seating assembly 10 includes a vehicle seatback 42 as well as a vehicle seat 44. The vehicle seatback 42 is operably coupled with the vehicle seat 44 via a recliner heart 46. The recliner heart 46 allows for adjustment of the vehicle seatback 42 relative to the vehicle seat 44 across a wide range of reclination positions. A seat base 48 supports the vehicle seat 44 and may be fixedly or slidably attached thereto so that the relative position of the vehicle seat 44 in the vehicle 40 can be adjusted to accommodate different shapes and sizes of passengers.

With reference again to FIGS. 1A-4, the seat frame 12 of the vehicle seatback 42 is a generally rigid structure formed from a material, such as metal or a hard composite plastic. The seat frame 12 includes first and second side members 60, 62 and an upper cross member 64 extending therebetween. Each of the vehicle seat side members 60, 62 is operably coupled with one recliner heart 46. The upper cross member 64 is configured to conform to the upper back of a passenger and provide support thereto. The first and second side members 60, 62 are structural supports that include an arcuate construction to conform to the back of a seated passenger. The cushion assembly 18, which partially overlays the upper cross member 64, as well as the first and second side members 60, 62, is configured to closely match the back of a seated passenger.

With reference again to FIGS. 2 and 3, the inner close-out panel 16 is configured to securely engage directly with the seat frame 12 or brackets on the seat frame 12 via mechanical fasteners. The cushion assembly 18 includes first and second side bolsters 66, 68 configured to support the sides of a passenger during travel. In addition, an upper portion 70 of the cushion assembly 18 includes a small indent 72 configured to receive an upper trim piece and a head restraint. In addition, a head restraint securing aperture 74 is disposed in the upper trim piece 32. The composite support member 20 is encompassed within the cushion assembly 18. The composite support member 20 gives structure and support to the cushion assembly 18 during the manufacturing process and also during subsequent use by a seated passenger. The composite support member 20 includes a generally O-shaped construction defining a large inner opening 80. In addition, the composite support member 20 includes an inner rim 82 and an outer rim 84 that provide additional structural support to the composite support member 20 and to the entire cushion assembly 18. A plurality of intermediate cross-supports 86 extend between the inner rim 82 and the outer rim 84. The plurality of intermediate cross-supports 86 give the composite support member 20 some lateral support and rigidity to the composite support member 20 and the cushion assembly 18. In the illustrated embodiment, a plurality of peripheral laterally extending securing rings 90 extend outwardly from the outer rim 84. The laterally extending securing rings 90 are generally encompassed by the cushion assembly 18, thus securing the composite support member 20 within the cushion assembly 18.

Figure 4:
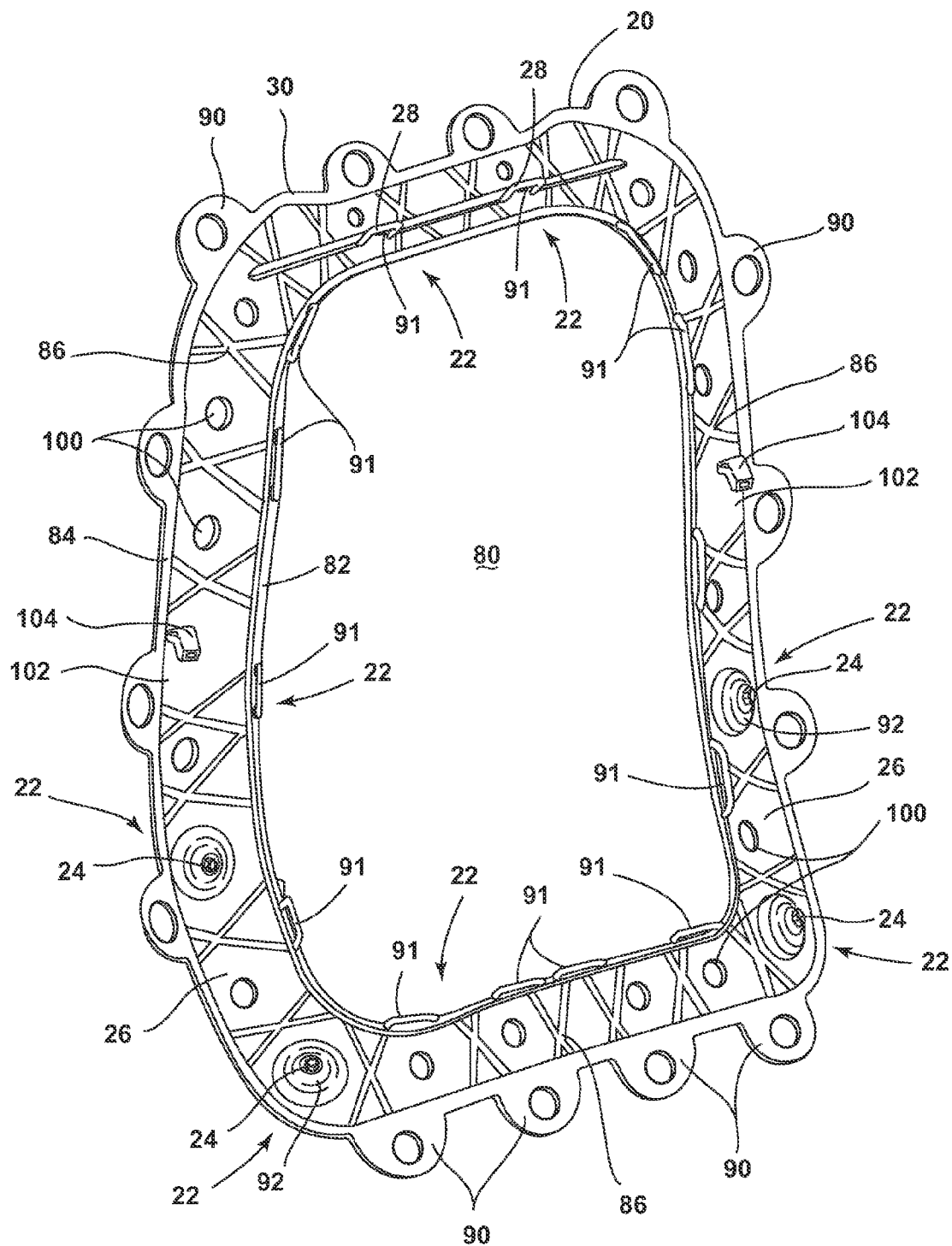
FIG. 4 is a rear perspective view of one embodiment of a composite support member of the vehicle seating assembly of the present disclosure.
Figure 5:
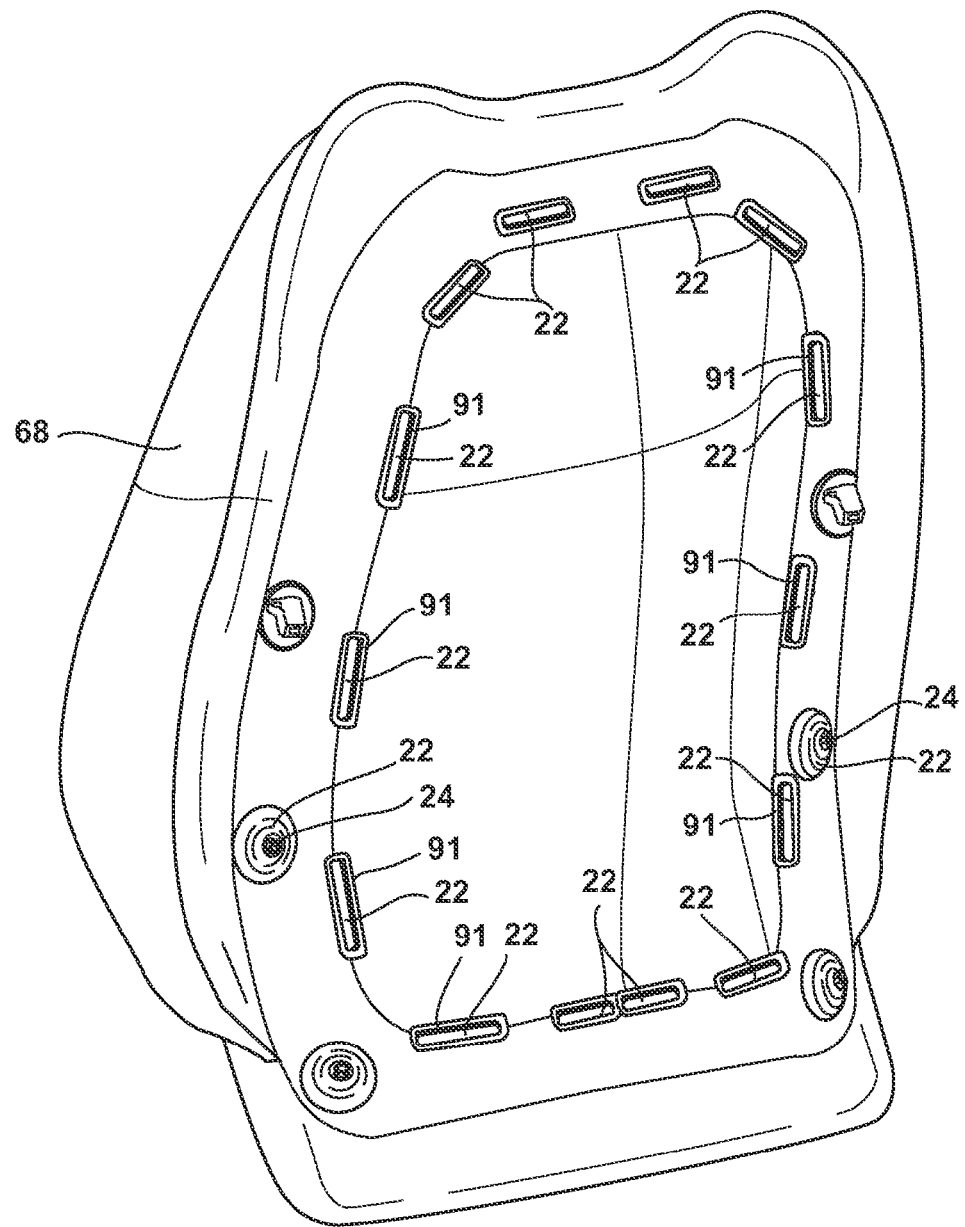
FIG. 5 is a rear perspective view of one embodiment of a seatback assembly of the vehicle seating assembly of the present disclosure.

With reference to the embodiments illustrated in FIGS. 4 and 5, the attachment members 22 of the composite support member 20 include a plurality of engagement loops 91 intermittently spaced peripherally around the large central opening 80. The engagement loops 91 may be molded or fastened into the composite support member 20. The plurality of engagement loops 91 are elastic and flexible and generally configured to engage connection features 92 on the inner close-out panel 16, as explained in further detail herein. In one embodiment, the engagement loops 91 are flexible elastic cords that are easily graspable by a manufacturer during assembly. The plurality of engagement loops 91 are proximate or located on the inner rim 82 of the composite support member 20 and protrude rearwardly from the composite support member 20. The plurality of engagement loops 91 are generally configured to protrude through apertures 94 on a backside 96 of the cushion assembly 18. Accordingly, the plurality of engagement loops 91 are available for engagement with the inner close-out panel 16, thus supporting the cushion assembly 18 and the composite support member 20 against the inner close-out panel 16, and ultimately onto the seat frame 12.

Figure 6:
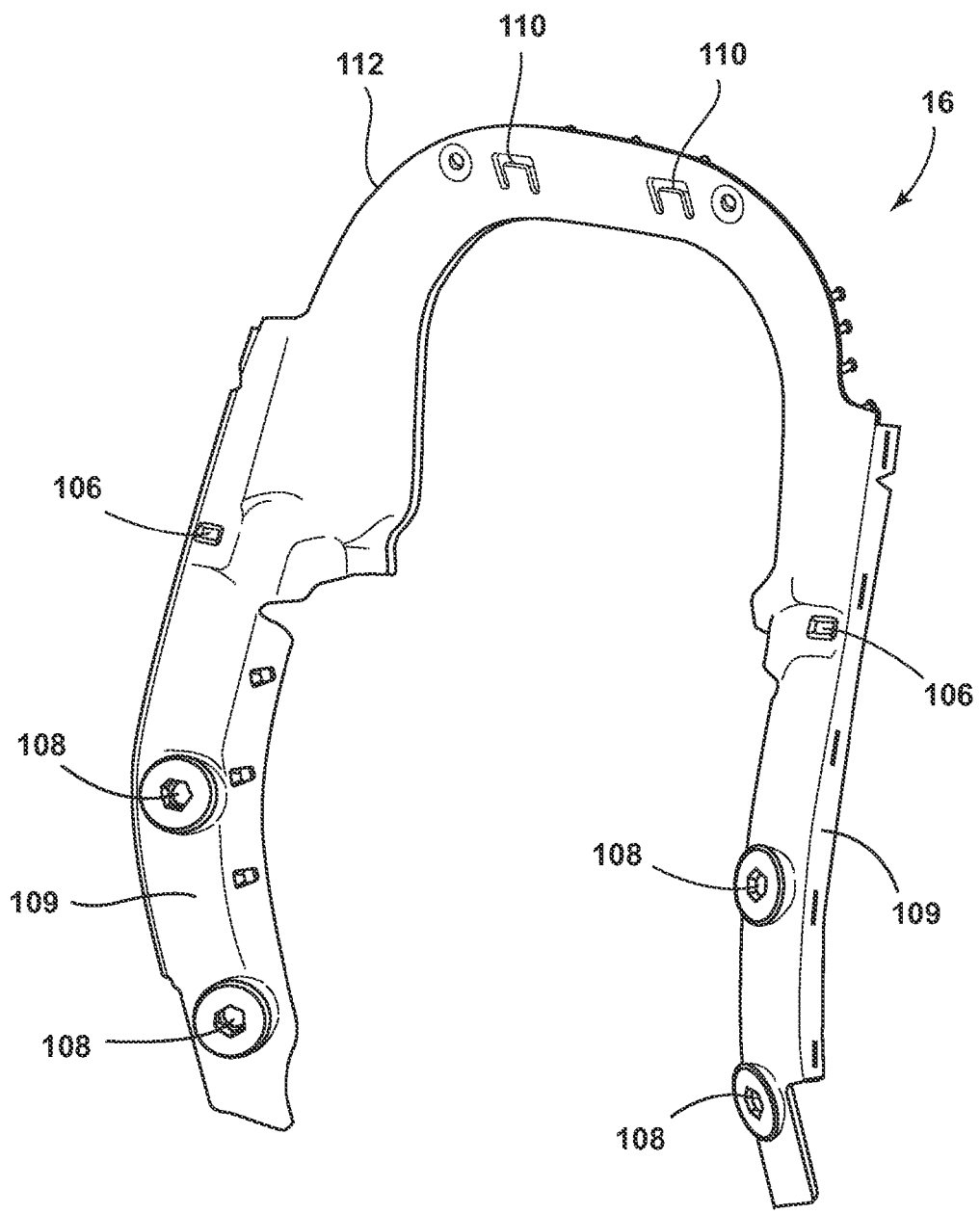
FIG. 6 is a front perspective view of one embodiment of an inner closeout panel for use in a seatback assembly of the present disclosure.
Figure 10:
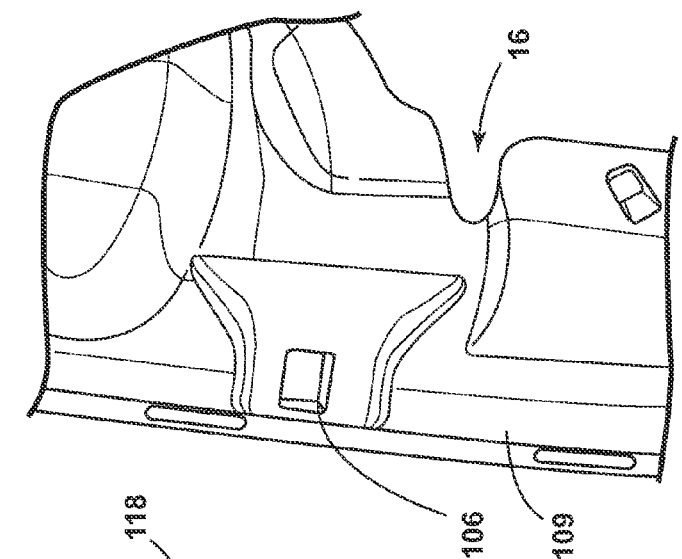
FIG. 10 is an enlarged partial front perspective view of receiving slots in the inner closeout panel of FIG. 6.
Figure 8:
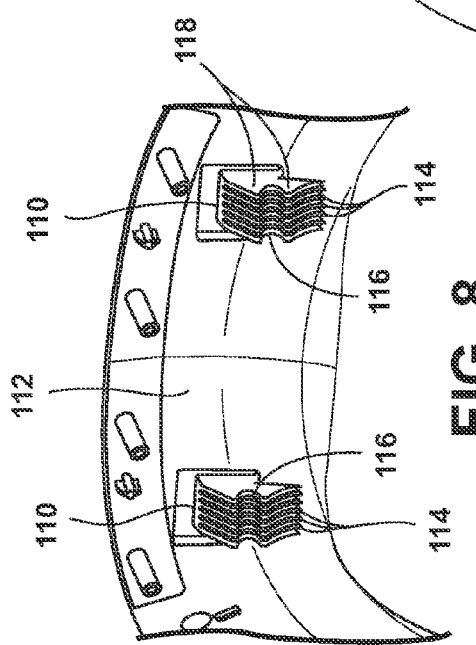
FIG. 8 is an enlarged partial rear perspective view of attachment members of the inner closeout panel of FIG. 6.
Figure 9:
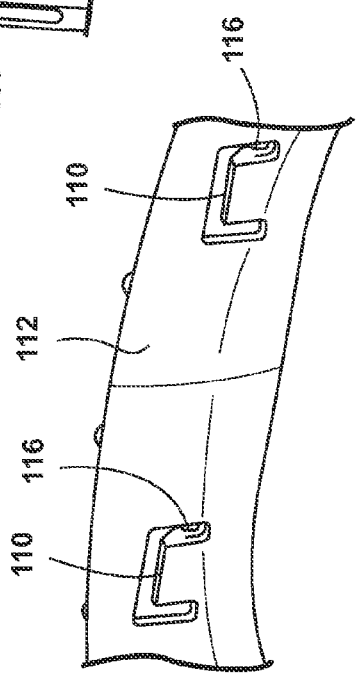
FIG. 9 is an enlarged partial front perspective view of the attachment members of the inner closeout panel of FIG. 6.
Figure 7:
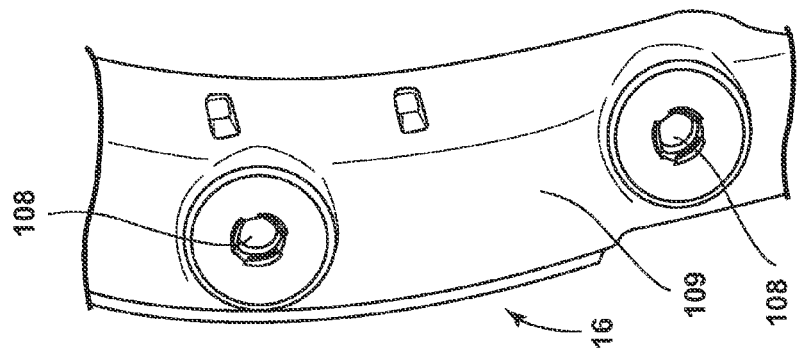
FIG. 7 is an enlarged partial perspective view of snap-fit features of the inner closeout panel of FIG. 6.

Referring now to FIGS. 4 and 6, the composite support member 20 also includes a plurality of holes 100 extending through the composite support member 20, which are designed to lessen the overall weight of the composite support member 20 and the cushion assembly 18. An intermediate portion 102 on each side of the composite support member 20 includes a downwardly directed hook feature 104. Each hook feature 104 extends through the backside 96 of the cushion assembly 18 and is configured for engagement with receiving slots 106 in the inner close-out panel 16. Accordingly, during installation, the cushion assembly 18 can be placed onto the inner close-out panel 16 with the downwardly directed hook features 104 extending into the receiving slots 106 of the inner close-out panel 16. The snap-fit features 24 on the lower portion 26 of the composite support member 20 can then be frictionally engaged with snap-fit slots 108 on side portions 109 of the inner close-out panel 16 to removably secure a lower portion of the cushion assembly 18 with the inner close-out panel 16. At the same time, at least two of the plurality of engagement loops 91 on the upper portion 30 of the composite support member 20, which project through the apertures 94 on the backside 96 of the cushion assembly 18, are placed in secure engagement with retention hooks 110 (FIG. 6) disposed on an upper portion 112 of the inner close-out panel 16. Each of the retention hooks 110 includes a plurality of ribs 114 that extend in a generally vertical direction orthogonal to a loop receiving channel 116 defined on each retention hook 110. Each loop receiving channel 116 is configured to receive one engagement loop 91. Specifically, one engagement loop 91 is slid over one retention hook 110 until the engagement loop 91 slides into the loop receiving channel 116. Ridges 118 maintain each engagement loop 91 in secure engagement with the loop receiving channel 116 and the retention hook 110. After connection of the inner close-out panel 16 with the composite support member 20 and cushion assembly 18, the inner close-out panel 16 is then secured with the seat frame 12 and hard back panel 14. The hard back panel 14 includes at least two forwardly extending downward-turned assembly hooks 120 configured to engage hook-receiving apertures 122 in an upper portion of the seat frame 12. The inner close-out panel 16 is configured to engage sidewalls of the hard back panel 14 using engagement features 130 disposed on side portions of the inner close-out panel 16.

The trim and foam assembly for a vehicle seat, as set forth herein, is configured to minimize costs and manufacturing time for constructing vehicle seating assemblies. The composite support member that is integrally formed in the cushion assembly provides a lightweight solution that is comfortable and can be securely coupled an inner close-out panel and a seat frame, and at the same minimize the need for additional fasteners.

It will also be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
    a seat frame disposed between an integrally formed back panel and an inner close-out panel, wherein the back panel includes forward hooks configured to engage hook-receiving apertures defined in the seat frame;
    a cushion assembly operably coupled to the inner close-out panel;
    a composite support member substantially encompassed by the cushion assembly, the composite support member including attachment members projecting rearwardly from inside the cushion assembly and engaged with the inner close-out panel, the attachment members including:
        snap-fit features disposed at a lower portion of the composite support member; and
        retaining rings disposed at an upper portion of the composite support member; and
    an upper trim piece extending over a top portion of the seat frame, the back panel, and the inner close-out panel.

2. The vehicle seating assembly of claim 1, wherein the inner close-out panel is securely engaged directly with the seat frame via mechanical fasteners.

3. The vehicle seating assembly of claim 1, wherein an upper portion of the inner close-out panel includes an indented portion configured to closely receive the upper trim piece.

4. The vehicle seating assembly of claim 1, wherein the composite support member defines a large inner opening, and wherein a plurality of loops are integrally molded into the composite support member proximate the large inner opening.

5. The vehicle seating assembly of claim 1, wherein the inner close-out panel includes a plurality of hooks, and wherein each of the plurality of hooks is configured to engage one loop.

6. The vehicle seating assembly of claim 5, wherein each of the plurality of hooks includes multiple ribs that extend orthogonal to a loop receiving channel.

7. A vehicle seating assembly comprising:
    a seat frame disposed between an integrally formed back panel and an inner close-out panel, wherein the back panel includes forward hooks configured to engage hook-receiving apertures defined in the seat frame;
    a cushion assembly;
    a composite support member substantially encompassed by the cushion assembly, the composite support member including attachment members projecting rearwardly from inside the cushion assembly and engaged with the inner close-out panel; and
    an upper trim piece extending over a top portion of the seat frame, back panel, and inner close-out panel.

8. The vehicle seating assembly of claim 7, wherein the inner close-out panel is securely engaged directly with the seat frame via mechanical fasteners.

9. The vehicle seating assembly of claim 7, wherein an upper portion of the inner close-out panel includes an indented portion configured to closely receive the upper trim piece.

10. The vehicle seating assembly of claim 7, wherein the composite support member defines a large inner opening, and wherein a plurality of loops are integrally molded into the composite support member proximate the large inner opening.

11. The vehicle seating assembly of claim 7, wherein the inner close-out panel includes a plurality of retention hooks, and wherein each of the plurality of retention hooks is configured to engage one loop.

12. The vehicle seating assembly of claim 11, wherein each of the plurality of retention hooks includes multiple ribs that extend orthogonal to a loop receiving channel.

13. A vehicle seating assembly comprising:
   a cushion assembly;
   a composite support member substantially encompassed by the cushion assembly and defining a large central opening, the composite support member further including engagement loops spaced peripherally around the large central opening and snap-fit connection features exposed through the cushion assembly and engaged with snap-fit connection features on an inner close-out panel;
   a hard back panel operably coupled to the cushion assembly, wherein the hard back panel includes forward hooks configured to engage hook-receiving apertures defined in a seat frame; and
   an upper trim piece extending over a top portion of the inner close-out panel.

14. The vehicle seating assembly of claim 13, further comprising: an inner close-out panel including an indented portion configured to closely receive the upper trim piece.

15. The vehicle seating assembly of claim 14, wherein the inner close-out panel includes a plurality of hooks and wherein each of the plurality of hooks is configured to engage one engagement loop.

16. The vehicle seating assembly of claim 13, wherein the composite support member includes a plurality of laterally extending securing rings encompassed by the cushion assembly.

17. The vehicle seating assembly of claim 13, wherein the composite support member includes snap-fit features disposed at a lower portion of the composite support member and retaining rings disposed at an upper portion of the composite support member.

* * * * *